A. SOUHEUR.
SECURING WHEELS TO AXLES.
No. 177,581.
Patented May 16, 1876.
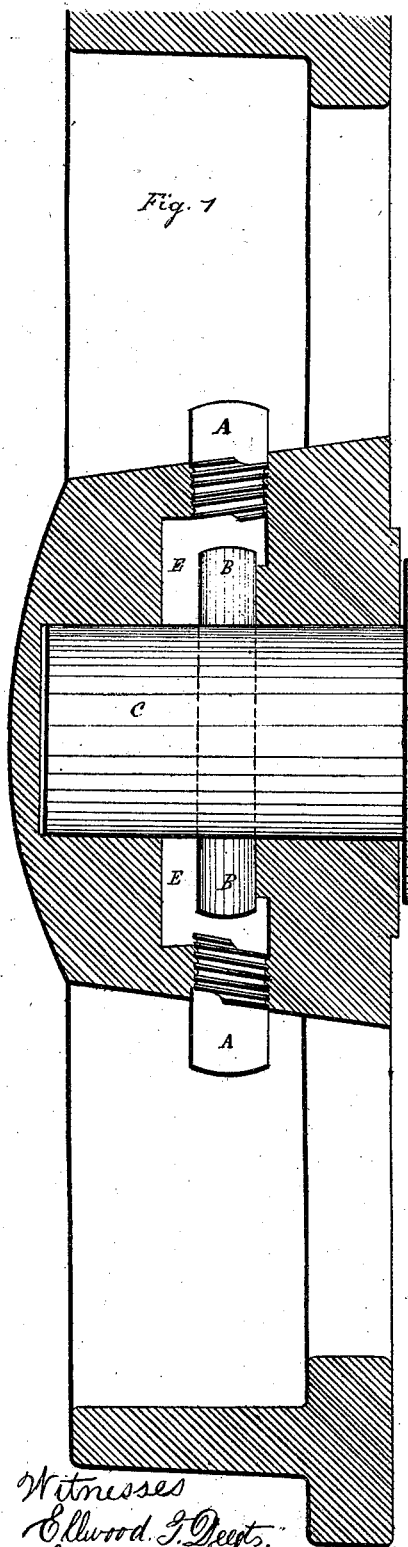
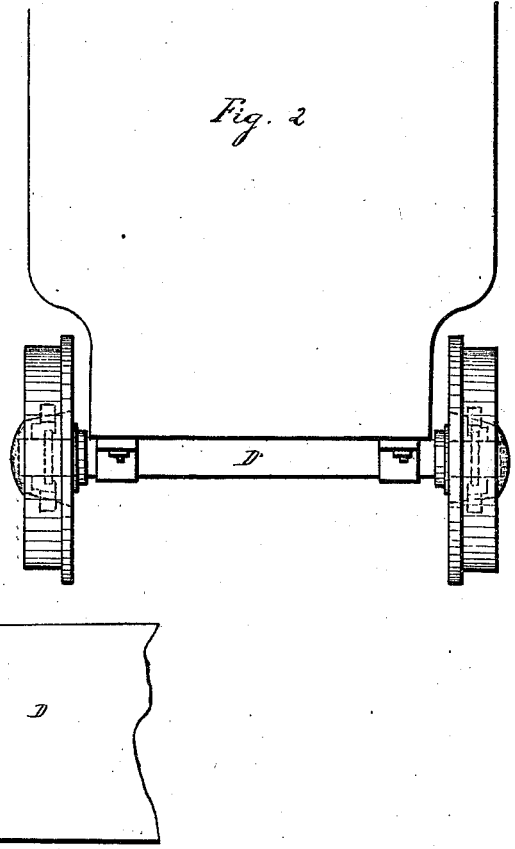
Witnesses
Ellwood F. Deetz
Harry Smith
Arnold Souheur
by his Attorneys
Howson and Son

UNITED STATES PATENT OFFICE.

ARNOLD SOUHEUR, OF SERAING, BELGIUM.

IMPROVEMENT IN SECURING WHEELS TO AXLES.

Specification forming part of Letters Patent No. 177,581, dated May 16, 1876; application filed January 15, 1876.

*To all whom it may concern:*

Be it known that I, ARNOLD SOUHEUR, of Seraing, Belgium, engineer, have invented certain Improvements in the Wheels of Vehicles, and in the mode or means of connecting the same to their axles, of which the following is a specification:

The object of my invention is to so secure the wheels to the axles of railroad and other cars that, while the lubricating material is thereby retained and the dust excluded, the means of attachment may be secure, yet readily removed when desired. This object I attain in the manner which I will now proceed to describe, reference being had to the accompanying drawing, in which—

Figure 1 is an enlarged sectional view of a car wheel and axle with my improvement attached, and Fig. 2 an end view of the car and wheels.

The journal C of the car-axle D is adapted to a bearing in the hub of the car-wheel, this bearing, as shown in Fig. 1, not passing to the outside of the hub, but being closed at the outer end, in order to exclude the dust and retain the lubricating material. Near the center of the hub is formed an interior annular chamber, E, for the reception of the lubricating material, this chamber having two openings formed opposite each other at right angles to the axle. These openings are closed by screw or other suitable plugs A, as shown in the drawing. The wheel is secured to the axle by the linchpin B, the ends of which traverse the lubricating-chamber E, thus aiding in carrying the oil or grease to the journal and bearings. This linchpin B is extracted by removing the two plugs A and forcing the pin out at one opening by a suitable tool inserted through the opposite opening, the detachment being thus much more readily made than when there is but one opening.

I do not desire to claim, broadly, the hub of a car-wheel having its bearings closed at the outer end; but

I claim as my invention—

A car-wheel hub having a closed bearing and chamber, E, with two opposite openings, in combination with the journal C of the axle and the linchpin B.

In testimony whereof I have signed my name to this specification in the presence of two subscribing witnesses.

ARNOLD SOUHEUR.

Witnesses:
F. G. RUBENJEK,
J. A. CONINCK.